(12) United States Patent
Kotegawa et al.

(10) Patent No.: US 10,290,295 B2
(45) Date of Patent: May 14, 2019

(54) SOUND MASKING DEVICE, VEHICLE, AND SOUND MASKING METHOD

(71) Applicant: PANASONIC INTELLECTUAL PROPERTY MANAGEMENT CO., LTD., Osaka (JP)

(72) Inventors: Kazuhisa Kotegawa, Osaka (JP); Kiyohisa Higashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/832,191

(22) Filed: Dec. 5, 2017

(65) Prior Publication Data

US 2018/0166061 A1 Jun. 14, 2018

(30) Foreign Application Priority Data

Dec. 9, 2016 (JP) .................................. 2016-239831

(51) Int. Cl.
*G10K 11/178* (2006.01)
*G10K 11/175* (2006.01)
*H04R 3/12* (2006.01)
*H04R 3/00* (2006.01)

(52) U.S. Cl.
CPC .......... *G10K 11/178* (2013.01); *G10K 11/175* (2013.01); *B60L 2270/142* (2013.01); *G10K 2210/1282* (2013.01); *H04R 3/005* (2013.01); *H04R 3/12* (2013.01); *H04R 2410/05* (2013.01); *H04R 2499/13* (2013.01)

(58) Field of Classification Search
None
See application file for complete search history.

(56) References Cited

U.S. PATENT DOCUMENTS

| 4,438,526 | A | * | 3/1984 | Thomalla | G10K 11/175 367/1 |
| 9,445,189 | B2 | | 9/2016 | Yuzuriha | |
| 2003/0142833 | A1 | * | 7/2003 | Roy | H04R 27/00 381/73.1 |
| 2006/0009969 | A1 | * | 1/2006 | L'Esperance | G10K 11/175 704/226 |
| 2009/0214050 | A1 | * | 8/2009 | Sawashi | H04R 3/04 381/73.1 |

(Continued)

FOREIGN PATENT DOCUMENTS

JP 03-93251 U 9/1991

*Primary Examiner* — James K Mooney
(74) *Attorney, Agent, or Firm* — Greenblum & Bernstein, P.L.C.

(57) ABSTRACT

Provided is a sound masking device that can effectively mask a noise at a predetermined position in a vehicle. Sound masking device includes: information acquisition unit that acquires frequency information indicating a frequency of a noise; signal source that generates a masker signal in order to output a masker sound masking the noise; pitch shifting unit that performs pitch shifting on the masker signal according to the frequency information that has been acquired; first corrector that performs correction on the masker signal after the pitch shifting according to the predetermined position; and output unit that outputs the masker signal after the correction.

21 Claims, 12 Drawing Sheets

(56) References Cited

U.S. PATENT DOCUMENTS

2015/0043744 A1\* 2/2015 Lagodzinski .......... H04R 3/002
                                                    381/73.1
2016/0372103 A1\* 12/2016 Jung .................... H04R 29/004
2017/0294180 A1   10/2017 Hiraga et al.

\* cited by examiner

US 10,290,295 B2

SOUND MASKING DEVICE, VEHICLE, AND SOUND MASKING METHOD

BACKGROUND

1. Technical Field

The present disclosure relates to a sound masking device that reduces unpleasantness due to a noise by outputting a masker sound masking the noise, a vehicle including the sound masking device, and a sound masking method.

2. Description of the Related Art

Conventionally, there is known a technology of reducing the unpleasantness felt by a user due to the noise using a masking theory. For example, PTL 1 discloses a noise eliminating device that outputs a white noise having volume slightly smaller than volume of the noise like meshing sound of gears in order to cause a user to hardly hear the noise.

CITATION LIST

Patent Literature

PTL 1: Unexamined Japanese Utility Model Publication No. H3-093251

SUMMARY

The present disclosure provides a sound masking device and a sound masking method, for being able to effectively mask the noise at a predetermined position in a vehicle.

A sound masking device according to one aspect of the present disclosure includes an information acquisition unit, a signal source, a pitch shifting unit, a corrector, and an output unit. The information acquisition unit acquires frequency information indicating a frequency of a noise in a vehicle. The signal source generates a masker signal in order to output a masker sound masking the noise at a predetermined position in the vehicle. The pitch shifting unit performs pitch shifting on the masker signal according to the frequency information that has been acquired. The corrector performs correction on the masker signal after the pitch shifting according to the predetermined position. The output unit outputs the masker signal after the correction.

In the sound masking device of the present disclosure, the noise can effectively be masked at the predetermined position in the vehicle.

DETAILED DESCRIPTION

Figure 1:
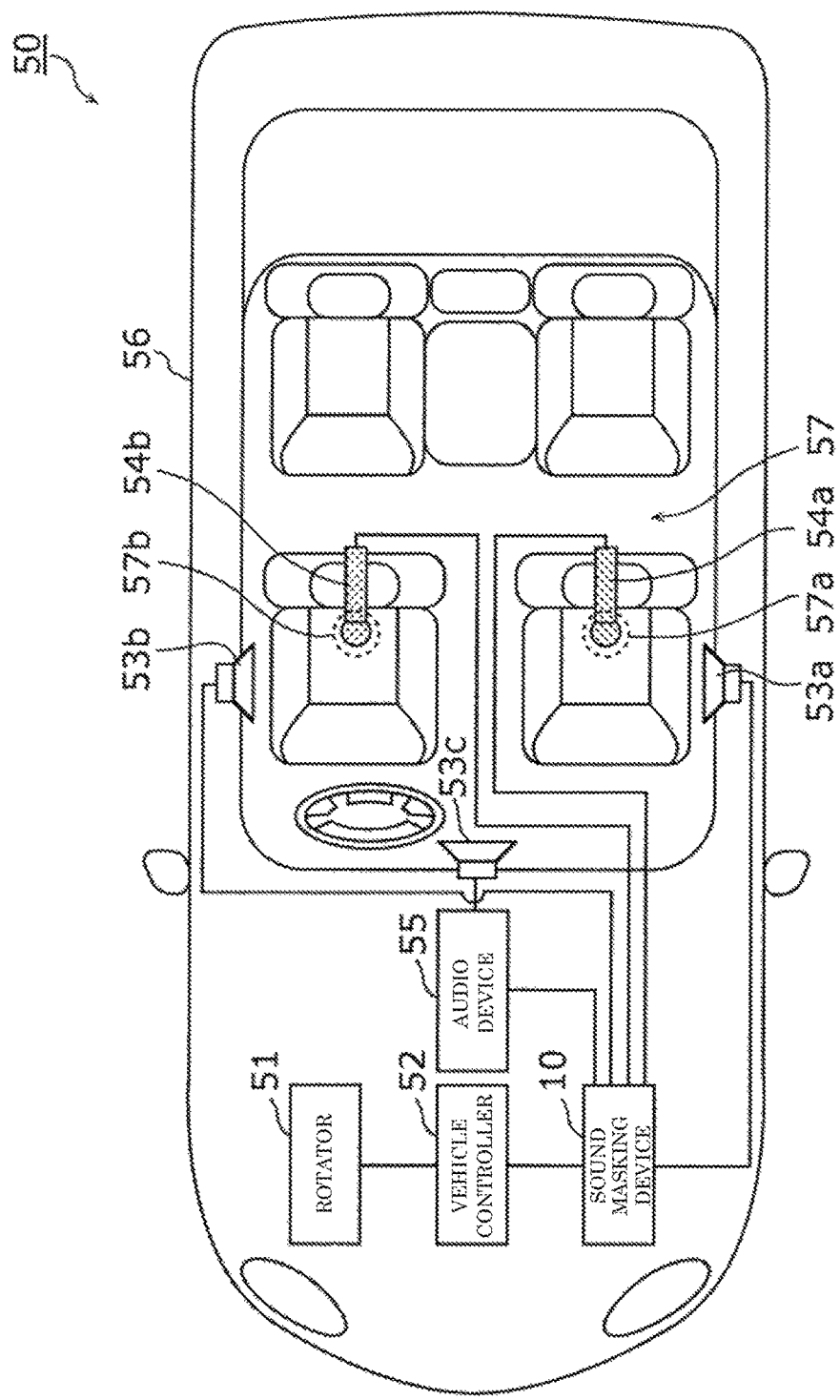
FIG. 1 is a schematic diagram illustrating a vehicle including a sound masking device according to an exemplary embodiment.

Prior to descriptions of an exemplary embodiment of the present disclosure, a problem in the conventional device will briefly be described. When the masker sound masking the noise (maskee) is smaller than the noise, sometimes an effect masking the noise is insufficiently obtained. On the other hand, when the masker sound is considerably larger than the noise, the masker sound becomes offensive to a user's ears. As described above, in the sound masking device in which a masking theory is used, characteristics (such as volume) of the masker sound become important. More particularly, it is important to produce the masker sound in consideration of a spectral characteristic and the volume in each frequency.

However, when the masker sound is simply output from an output unit such as a speaker, because an acoustic transfer function from the output unit to a predetermined position such as an ear position of an occupant is not considered, a desired relationship is not obtained between the masker sound and the noise, and the problem cannot be solved.

According to a first aspect of the present disclosure, a sound masking device includes an information acquisition unit, a signal source, a pitch shifting unit, a corrector, and an output unit. The information acquisition unit acquires frequency information indicating a frequency of a noise in a vehicle. The signal source generates a masker signal in order to output a masker sound masking the noise at a predetermined position in the vehicle. The pitch shifting unit performs pitch shifting on the masker signal according to the frequency information that has been acquired. The corrector performs correction on the masker signal after the pitch shifting according to the predetermined position. The output unit outputs the masker signal after the correction.

Therefore, in the sound masking device, the masker signal is corrected according to the predetermined position, so that the noise can effectively be masked at the predetermined position.

According to a second aspect of the present disclosure, a sound masking device includes an information acquisition unit, a signal source, a pitch shifting unit, a corrector, and an output unit. The information acquisition unit acquires rotation number information about a rotator, the rotation number information being correlated to a frequency of a noise in a vehicle. The signal source generates a masker signal in order to output a masker sound masking the noise at a predetermined position in the vehicle. The pitch shifting unit performs pitch shifting on the masker signal according to the rotation number information that has been acquired. The corrector performs correction on the masker signal after the pitch shifting according to the predetermined position. The output unit outputs the masker signal after the correction.

Therefore, in the sound masking device, the masker signal is corrected according to the predetermined position, so that the noise can effectively be masked at the predetermined position.

For example, the masker sound has a characteristic in which volume fades in and fades out.

Therefore, the occupant hardly perceives a boundary of the masker sound generated by the continuous, repetitive use of the masker signal. The sound masking device may have an effect that an abnormal noise caused by a rapid level change is not output at starting or ending of the output of the masker sound.

For example, the corrector may multiply the masker signal after the pitch shifting by a coefficient, as the correction corresponding to the predetermined position.

Therefore, the sound masking device can effectively mask the noise at the predetermined position by multiplying the masker signal by the coefficient.

For example, the corrector may perform filter processing on the masker signal after the pitch shifting, as the correction corresponding to the predetermined position.

Therefore, the sound masking device can effectively mask the noise at the predetermined position by performing the filter processing on the masker signal.

For example, the corrector may perform processing of changing a phase of the masker signal after the pitch shifting, as the correction corresponding to the predetermined position.

Therefore, the sound masking device can effectively mask the noise at the predetermined position by changing the phase of the masker signal.

For example, the corrector may perform correction on the masker signal after the pitch shifting such that a difference in magnitude between the masker sound and the noise at the predetermined position is greater than or equal to a predetermined level, as the correction corresponding to the predetermined position.

Therefore, the sound masking device can suppress deficiency in volume of the masker sound, and effectively mask the noise.

For example, the information acquisition unit may further acquire running state information about the vehicle, and the corrector may change a content of the correction performed on the masker signal after the pitch shifting according to the running state information that has been acquired.

Therefore, the sound masking device can output the masker signal in consideration of the running state of the vehicle.

For example, the running state information may include at least one of load information about the vehicle, speed information about the vehicle, gas pedal position information about the vehicle, and gear position information in the vehicle.

Therefore, the sound masking device can output the masker sound in consideration of a torque, a speed, a gas pedal position, and a gear position of the running vehicle.

For example, the predetermined position may be a position on which the occupant sits in the vehicle.

Therefore, the sound masking device can mask the noise at the position on which the occupant sits in the vehicle.

For example, the sound masking device may further include a sound signal acquisition unit that acquires a sound signal output by a microphone mounted at the predetermined position. The corrector may change the content of the correction performed on the masker signal after the pitch shifting according to the sound signal that has been acquired.

Therefore, the sound masking device can output the masker signal in consideration of a noise level at the predetermined position.

For example, the signal source may generate the masker signal by performing noise filter processing on a noise signal.

Therefore, the sound masking device can generate the masker signal based on the noise signal.

For example, the noise signal may be a white noise.

Therefore, the sound masking device can generate the masker signal based on the white noise.

For example, the noise filter processing may be filter processing in which a bandpass filter is used.

Therefore, the sound masking device can generate the masker signal through the filter processing in which a bandpass filter is used.

For example, the sound masking device may further include a determination unit that determines whether sound is output from a speaker mounted in the vehicle. When the determination unit determines that the sound is output from the speaker, the output unit may stop the output of the masker signal after the correction.

Therefore, the sound masking device can output the masker signal in consideration of whether the music or the like is output in the vehicle.

For example, the determination unit may further determine whether the volume of the sound output from the speaker is greater than or equal to predetermined volume, and when the determination unit determines that the volume of the sound output from the speaker is greater than or equal to the predetermined volume, the output unit may stop the output of the masker signal after the correction.

Therefore, the sound masking device can stop the output of the masker signal in the case where the masking of the target noise is not required while the volume of the music or the like is larger.

According to a third aspect of the present disclosure, a vehicle includes: the sound masking device according to the first aspect or the second aspect; and a speaker that outputs the masker sound according to the masker signal that has been output.

In the vehicle, the sound masking device corrects the masker signal according to the predetermined position, so that the sound masking device can effectively mask the noise at the predetermined position.

According to a fourth aspect of the present disclosure, in a sound masking method, frequency information indicating a frequency of a noise in a vehicle is acquired. A masker signal is output in order to output a masker sound masking the noise at a predetermined position in the vehicle. Pitch shifting is performed on the masker signal according to the frequency information that has been acquired. The masker signal after the pitch shifting is corrected according to the predetermined position. The masker signal after correction is output.

In the sound masking method, the masker signal is corrected according to the predetermined position, so that the noise can effectively be masked at the predetermined position.

According to a fifth aspect of the present disclosure, in a sound masking method, rotation number information correlated to a frequency of a noise in a vehicle is acquired. A masker signal is output in order to output a masker sound masking the noise at a predetermined position in the vehicle. Pitch shifting is performed on the masker signal according to the rotation number information that has been acquired. The masker signal after the pitch shifting is corrected according to the predetermined position. The masker signal after correction is output.

In the sound masking method, the masker signal is corrected according to the predetermined position, so that the noise can effectively be masked at the predetermined position.

Hereinafter, an exemplary embodiment will specifically be described with reference to the drawings. Note that the following exemplary embodiment provides a comprehensive, specific example of the present disclosure. Numerical values, shapes, materials, components, arrangement positions and connection modes of the components, steps, and order of the steps, for example, illustrated in the exemplary embodiment are examples, and therefore are not intended to limit the present disclosure. Furthermore, among components in the following exemplary embodiment, a component that is not recited in the independent claim indicating the broadest concept is described as an optional component.

Each drawing is a schematic diagram, and is not necessarily strictly drawn. In each drawing, the same component as that in another drawing is designated by the same numeral, and sometimes the description is omitted or simplified.

EXEMPLARY EMBODIMENT

[Entire Configuration of Vehicle Including Sound Masking Device]

A sound masking device mounted on a vehicle will be described in an exemplary embodiment. FIG. 1 is a schematic diagram illustrating the vehicle including the sound masking device according to the exemplary embodiment.

Vehicle 50 that is an example of a mobile body apparatus includes sound masking device 10, rotator 51, vehicle controller 52, first speaker 53a, second speaker 53b, first microphone 54a, second microphone 54b, audio device 55, and vehicle body 56. Specifically, vehicle 50 is an automobile. However, there is no particular limitation on vehicle 50.

Rotator 51 is a structure disposed in vehicle 50 in order to drive wheels. Rotator 51 is a noise source of space 57 in a vehicle interior. For example, rotator 51 is disposed in a space different from space 57. Specifically, rotator 51 is mounted in the space formed in a hood of vehicle body 56. Rotator 51 is a rotator, such as an engine, a motor, a drive shaft, and a turbocharger (turbine), which is used to drive the wheels. Rotator 51 may be a rotator, such as a motor used in an air conditioner included in vehicle 50, which is used except for driving of the wheel.

Vehicle controller 52 controls (drives) rotator 51 based on operation by a driver of vehicle 50. For example, vehicle controller 52 is an electronic control unit (ECU). Specifically, vehicle controller 52 is constructed with a processor, a microcomputer, or a dedicated circuit. Vehicle controller 52 may be constructed with a combination of at least two of the processor, the microcomputer, and the dedicated circuit.

Vehicle controller 52 outputs a pulse signal according to the rotation number of rotator 51. The pulse signal is an example of information indicating a frequency of a noise (hereinafter, also referred to as a target noise) generated by rotation of rotator 51. In other words, the pulse signal is rotation number information correlated to the frequency of the noise in vehicle 50. For example, the frequency of the pulse signal is proportional to the rotation number (frequency) of rotator 51. Information indicating the frequency of the target noise is not limited to the pulse signal, but may be information indicating directly or indirectly the frequency of the target noise. For example, the information indicating the frequency of the target noise may be output through an in-vehicle network such as a controller area network (CAN) and Ethernet (registered trademark). For example, the frequency of the target noise is 200 Hz or more.

First speaker 53a outputs a masker sound according to the masker signal output from sound masking device 10. The masker sound is a sound masking the target noise in vehicle 50, and is a sound recognized as the noise by the occupant. For example, first speaker 53a is disposed in a wall (door) on an assistant driver's seat side in vehicle 50, and outputs the masker sound in order to mask the target noise at first predetermined position 57a near the assistant driver's seat. For example, first predetermined position 57a is a position on which the occupant sits in vehicle 50.

Second speaker 53b outputs the masker sound according to the masker signal output from sound masking device 10. For example, second speaker 53b is disposed in a wall (door) on a driver's seat side in vehicle 50, and outputs the masker sound in order to mask the target noise at second predetermined position 57b near the driver's seat. For example, second predetermined position 57b is a position on which the occupant (driver) sits in vehicle 50.

Third speaker 53c is disposed in vehicle 50, and outputs sound according to an audio signal output from audio device 55. The sound output from third speaker 53c is different from the masker sound, and is the sound recognized as, for example, music by the occupant.

First microphone 54a is disposed at first predetermined position 57a near the assistant driver's seat in space 57, and acquires the noise (including the target noise) at first predetermined position 57a. First microphone 54a outputs the sound signal according to the acquired noise.

Second microphone 54b is disposed at second predetermined position 57b near the driver's seat in space 57, and acquires the noise (including the target noise) at second predetermined position 57b. Second microphone 54b outputs the sound signal according to the acquired noise.

In FIG. 1, for convenience, the speakers and the microphones are disposed at front seats in vehicle 50 in order to mask the target noise. Actually, it is assumed that the target noise is masked at not only the front seats but also the rear seats. In this case, the speakers and the microphones are disposed at the rear seats.

Audio device 55 is what is called a car audio device, and is a device with which the occupant of vehicle 50 listens to music in vehicle 50. For example, audio device 55 can play back the sound (such as music) recorded in a recording disk or a semiconductor memory using third speaker 53c.

Vehicle body 56 is a structure constructed with a chassis and a body of vehicle 50, for example. Vehicle body 56 forms space 57 (a space in a vehicle interior) in vehicle 50 in which first speaker 53a, second speaker 53b, third speaker 53c, first microphone 54a, and second microphone 54b are disposed.

[Configuration and Basic Operation of Sound Masking Device]

Figure 2:
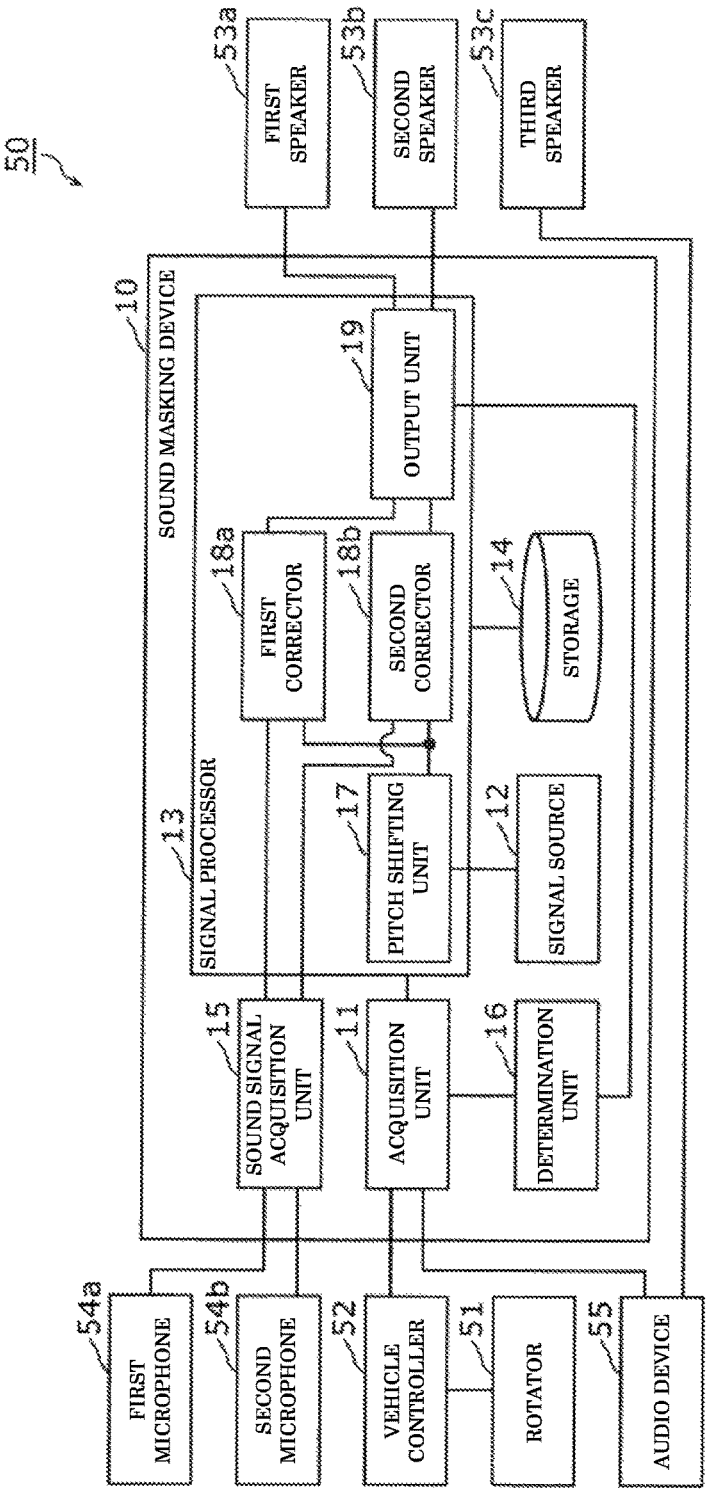
FIG. 2 is a functional block diagram illustrating the sound masking device of the exemplary embodiment.
Figure 3:
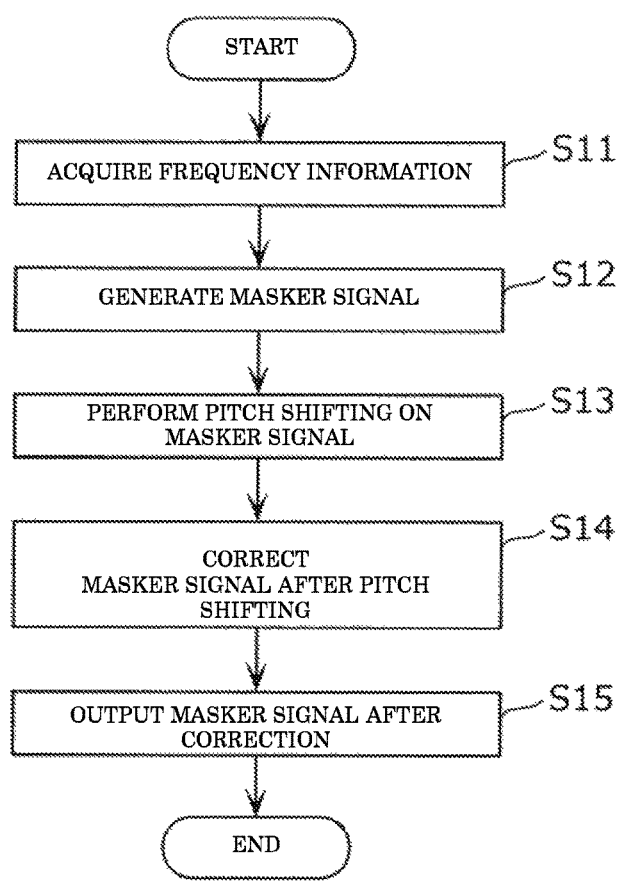
FIG. 3 is a flowchart illustrating basic operation of the sound masking device of the exemplary embodiment.

A configuration and basic operation of sound masking device 10 will be described below with reference to FIGS. 2 and 3 in addition to FIG. 1. FIG. 2 is a functional block diagram of sound masking device 10. FIG. 3 is a flowchart illustrating the basic operation of sound masking device 10.

Sound masking device 10 is a device that causes the occupant to hardly hear the target noise having a peak at a frequency corresponding to the rotation number of rotator

51. Specifically, in sound masking device 10, first speaker 53*a* and second speaker 53*b* output the masker sound.

Therefore, the target noise is masked by the masker sound while a peak level of the target noise is maintained. Because the occupant hardly hears the target noise, thus, sound masking device 10 can reduce the unpleasantness felt by the occupant. Masking the noise is different from canceling (reducing) the noise with sound having an opposite phase to the noise.

As illustrated in FIG. 2, sound masking device 10 includes information acquisition unit 11, signal source 12, signal processor 13, storage 14, sound signal acquisition unit 15, and determination unit 16. Each component will be described below with reference to FIGS. 1 to 3.

[Information Acquisition Unit]

Information acquisition unit 11 acquires frequency information indicating the frequency of the target noise in vehicle 50 (S11). Specifically, information acquisition unit 11 acquires the pulse signal corresponding to the rotation number of rotator 51 from vehicle controller 52 as the frequency information. For example, information acquisition unit 11 is a communication module (communication circuit) that acquires the pulse signal from vehicle controller 52 by communication pursuant to a standard of CAN. However, information acquisition unit 11 may be a communication module pursuant to another communications standard, and there is not limitation on information acquisition unit 11.

[Signal Source]

Signal source 12 generates the masker signal in order to output the masker sound masking the noise in vehicle 50 (S12). For example, signal source 12 reads a noise signal (data of the noise signal) stored in storage 14, and generates the masker signal by performing noise filter processing on the read noise signal. For example, the noise signal is the white noise. However, there is no particular limitation on the noise signal, and the noise signal may be other random noises such as a pink noise. For example, the noise signal may be a signal (the sound signal corresponding to a background noise) indicating the background noise in vehicle 50, the signal being acquired by the microphone disposed in vehicle 50.

Figure 4:
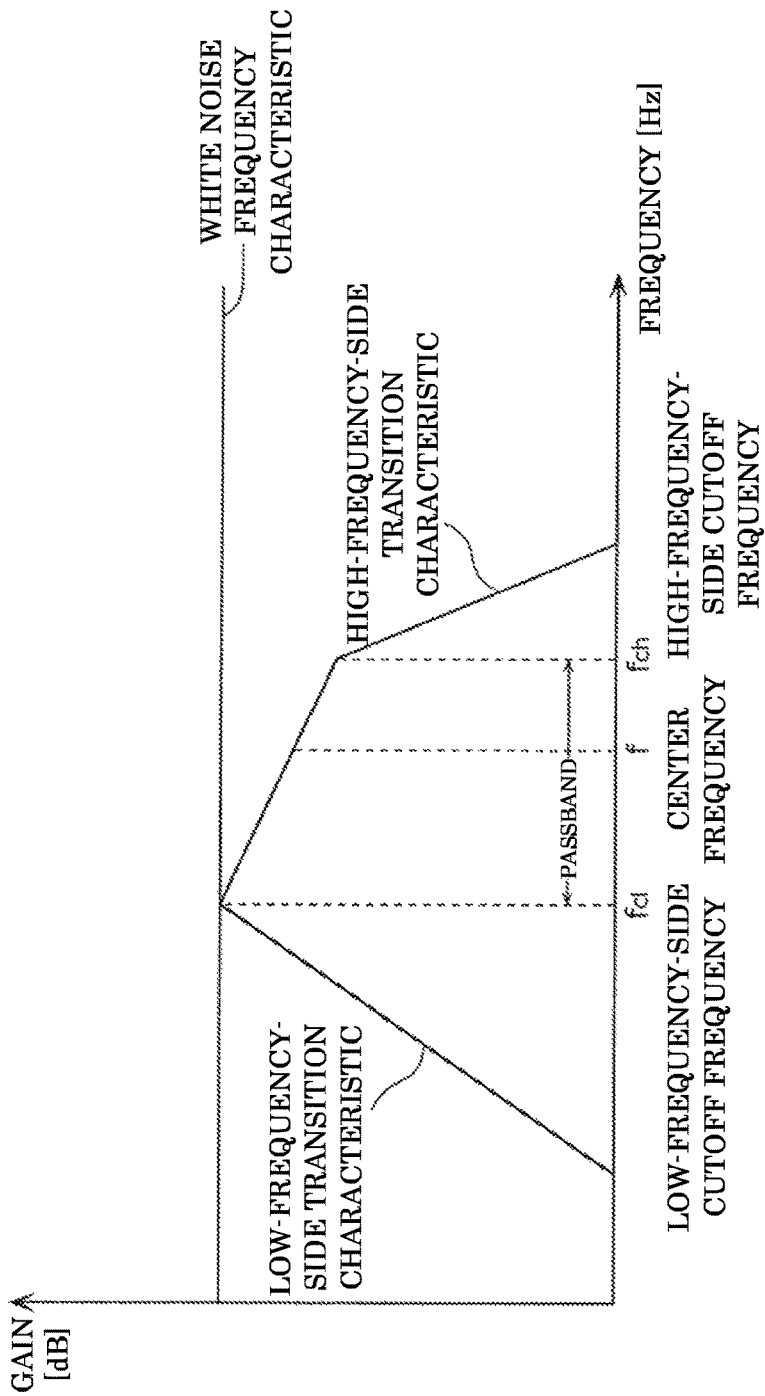
FIG. 4 is a diagram illustrating a masker signal generating method.

A masker signal generating method will be described below with reference to FIG. 4. FIG. 4 is a diagram illustrating the masker signal generating method. FIG. 4 illustrates a frequency characteristic of the white noise and a filter characteristic of the noise filter processing performed on the white noise.

For example, signal source 12 generates the masker signal by performing the noise filter processing on the white noise using a bandpass filter. The bandpass filter provides a high-frequency-side transition characteristic and a low-frequency-side transition characteristic in the filter characteristic of FIG. 4 to the white noise.

Signal source 12 can provide the high-frequency-side transition characteristic and the low-frequency-side transition characteristic to the white noise by a combination of a low-pass filter and a high-pass filter instead of the bandpass filter. Specifically, signal source 12 may perform, on the white noise, the noise filter processing in which the low-pass filter having high-frequency-side cutoff frequency fch and the high-frequency-side transition characteristic in FIG. 4 and the high-pass filter having a low-frequency-side cutoff frequency fcl and the low-frequency-side transition characteristic in FIG. 4 are combined.

A discomfort feeling generated by hearing the masker sound decreases when a gradient of a gain of a passband in the bandpass filter comes close to a gradient of a gain of the background noise in vehicle 50. For this reason, in the filter characteristic of FIG. 4, the gradient of the gain is provided to the passband of the bandpass filter. In other words, the noise filter processing provides a characteristic, in which the gain is attenuated with respect to an increase in frequency in the passband of the bandpass filter, to the noise signal.

For example, the low-pass filter having a transition characteristic of desired attenuation is applied to the white noise before the bandpass filter is applied to the white noise, which allows signal source 12 to provide the gradient of the gain to a band corresponding to the passband of the bandpass filter having the filter characteristic. Signal source 12 may provide the gradient of the gain to the band corresponding to the passband by another method.

In the case where the noise signal is the white noise having the gradient of the gain of zero, desirably the gradient of the gain of the passband is adjusted in a range of −3 dB/oct to −20 dB/oct inclusive, and more desirably the gradient of the gain of the passband is adjusted in a range of −6 dB/oct to −12 dB/oct inclusive. In the case where the noise signal is the random noise, such as the pink noise, which has the attenuation characteristic of the gain, the characteristic similar to the case where the noise signal is the white noise can be obtained when the low-pass filter having the characteristic in which the attenuation characteristic of the random noise is considered is applied.

Generally a band width in which an increase of a masking effect is not expected even if the band of the masker signal is widened is defined as a critical band. However, when the band of the masker signal is restricted to the critical band, sometimes the masker sound becomes conspicuous. In such cases, even if the target noise is masked, this will eventually not lead to the reduction of the unpleasantness.

At this point, according to the knowledge of the inventors of the present disclosure, the passband of the bandpass filter is set asymmetrical with respect to the center frequency according to an energy distribution of the background noise, which allows the reduction of the discomfort feeling generated by hearing the masker sound. Specifically, assuming that f (Hz) is the center frequency, the low-frequency-side cutoff frequency fcl may range from $f \times 2^{(-2)}$ Hz to $f \times 2^{(-2/3)}$ Hz inclusive, and the high-frequency-side cutoff frequency fch may range from $f \times 2^{(1/3)}$ Hz to $f \times 2$ Hz inclusive.

For example, signal source 12 is constructed with a processor such as a digital signal processor (DSP). Alternatively, signal source 12 may be constructed with a microcomputer, a dedicated circuit, or a combination of at least two of the processor, the microcomputer, and the dedicated circuit. Signal source 12 may be constructed as a part of signal processor 13.

For example, storage 14 in which the data of the noise signal is stored is constructed with a semiconductor memory. For example, in addition to the data of the noise signal, a filter coefficient used in the noise filter processing of the signal source and a control program executed by signal processor 13 are also stored in storage 14.

[Signal Processor: Pitch Shifting Unit]

Then, signal processor 13 performs signal processing on the masker signal output from signal source 12, and outputs the post-signal-processing masker signal to first speaker 53*a* and second speaker 53*b* (S13 to S15). Specifically, signal processor 13 includes pitch shifting unit 17, first corrector 18*a*, second corrector 18*b*, and output unit 19. For example, signal processor 13 is constructed with a processor such as a DSP. Alternatively, signal processor 13 may be constructed with a microcomputer, a dedicated circuit, or a combination of at least two of the processor, the microcomputer, and the dedicated circuit.

Figure 5:
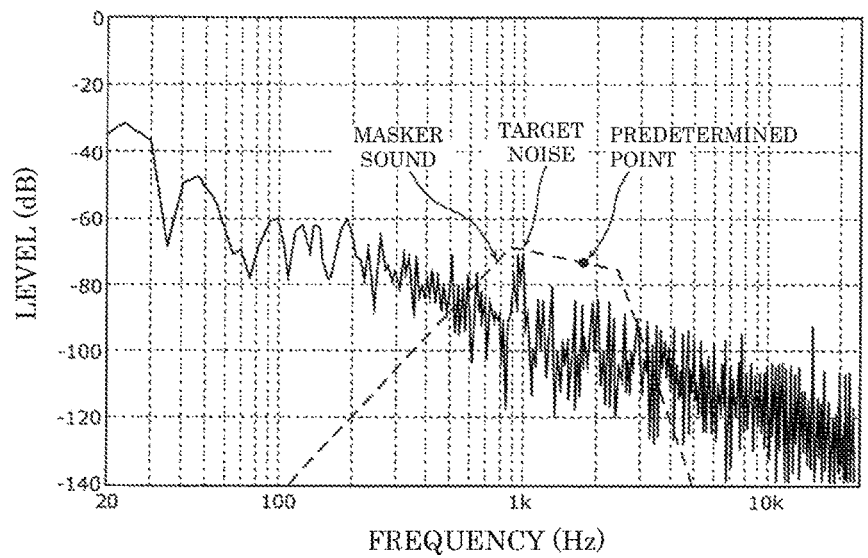
FIG. 5 is a first diagram illustrating a pitch shifting performed by a pitch shifting unit.
Figure 6:
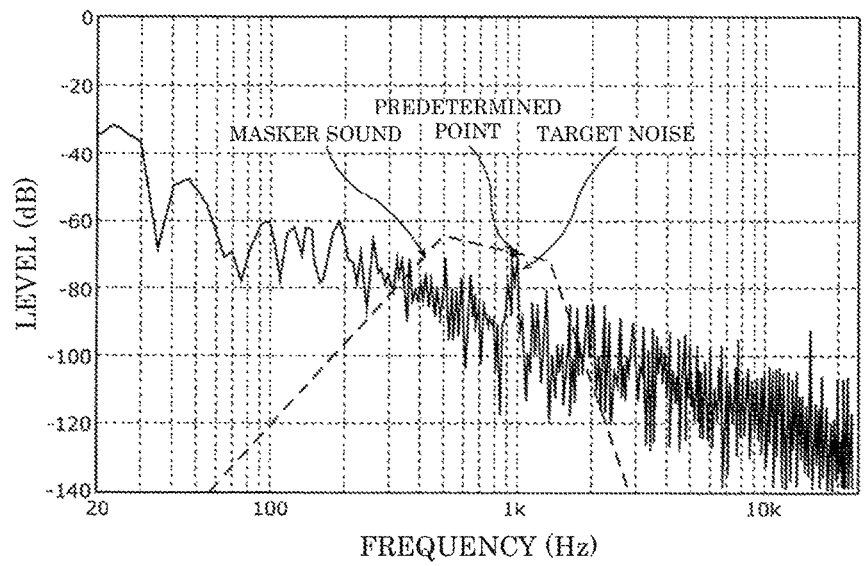
FIG. 6 is a second diagram illustrating the pitch shifting performed by the pitch shifting unit.

Pitch shifting unit 17 performs the pitch shifting on the masker signal according to the frequency information acquired by information acquisition unit 11 (S13). FIGS. 5 and 6 are diagrams illustrating the pitch shifting by pitch shifting unit 17. A frequency characteristic (solid line) of the noise in vehicle 50 and a schematic frequency characteristic (broken line) of the masker signal (masker sound) are illustrated in FIGS. 5 and 6.

In the case where the masker signal generated by signal source 12 has the frequency characteristic indicated by the broken line in FIG. 5, pitch shifting unit 17 performs the pitch shifting on the masker signal such that the frequency (center frequency f) at a predetermined point on a signal waveform of the masker signal is matched with the frequency of the target noise. Resultantly, the frequency characteristic of the masker signal is changed to the characteristic indicated by the broken line in FIG. 6. The masker signal on which the pitch shifting is performed is output to first corrector 18*a* and second corrector 18*b*.

[Signal Processor: Corrector]

Then, each of first corrector 18*a* and second corrector 18*b* corrects the masker signal on which the pitch shifting is performed (S14).

First corrector 18*a* performs correction on the masker signal on which the pitch shifting is performed by pitch shifting unit 17 according to first predetermined position 57*a*. Second corrector 18*b* performs correction on the masker signal on which the pitch shifting is performed by pitch shifting unit 17 according to second predetermined position 57*b*. Because first predetermined position 57*a* differs from second predetermined position 57*b*, second corrector 18*b* performs the correction different from the correction performed by first corrector 18*a*. In other words, the correction corresponding to the predetermined position is the correction that optimizes the masker sound at the predetermined position. That is, the correction corresponding to the predetermined position is the correction that improves the effect of the masker sound at the predetermined position compared to any other position.

For example, first corrector 18*a* and second corrector 18*b* multiply the masker signal after the pitch shifting by a coefficient as the correction corresponding to the predetermined position. In this case, the coefficient is the gain, and becomes a uniform value for the whole frequency band of the masker signal after the pitch shifting.

First corrector 18*a* and second corrector 18*b* may perform the filter processing on the masker signal after the pitch shifting, as the correction corresponding to the predetermined position. In other words, first corrector 18*a* and second corrector 18*b* may provide a different gain to the masker signal after the pitch shifting in each frequency band.

First corrector 18*a* and second corrector 18*b* may perform processing of changing a phase of the masker signal after the pitch shifting, as the correction corresponding to the predetermined position. For example, first corrector 18*a* and second corrector 18*b* perform an all pass filter (APF) processing to change the phase of the masker signal after the pitch shifting.

First corrector 18*a* and second corrector 18*b* may combine at least two of the multiplication of the coefficient, the filter processing, and the processing of changing the phase, as the correction corresponding to the predetermined position.

[Signal Processor: Output Unit]

Then, output unit 19 outputs the masker signal after correction (S15). Specifically, output unit 19 outputs the masker signal on which the correction is performed by first corrector 18*a* to first speaker 53*a*. Based on the masker signal, first speaker 53*a* outputs the masker sound masking the target noise heard at first predetermined position 57*a*.

Output unit 19 also outputs the masker signal on which the correction is performed by second corrector 18*b* to second speaker 53*b*. Based on the masker signal, second speaker 53*b* outputs the masker sound masking the target noise heard at second predetermined position 57*b*.

Therefore, the target noise is masked by the masker sound, and the occupant hardly hears the target noise. That is, sound masking device 10 can reduce the unpleasantness, which is caused by target noise and felt by the occupant.

For example, the masker sound is output from the speaker for a predetermined period. In the case where the masker sound is output for a longer period than the predetermined period, the masker signal corresponding to the masker sound is repeatedly used. The masker sound may have a characteristic in which the volume fades in and fades out. Therefore, the occupant hardly perceives a boundary of the masker sound generated by the continuous, repetitive use of the masker signal.

Operation Example 1

Figure 7:
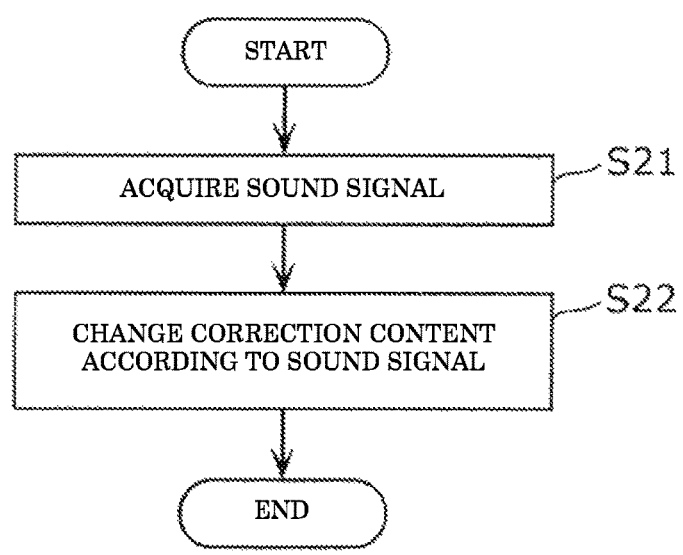
FIG. 7 is a flowchart illustrating Operation Example 1 of the sound masking device of the exemplary embodiment.

Operation Example 1 different from the basic operation of sound masking device 10 will be described below. For example, contents of the correction performed by first corrector 18*a* are fixed as long as first predetermined position 57*a* is not changed. However, first corrector 18*a* may dynamically correct the masker signal after the pitch shifting according to the sound signal output from first microphone 54*a* disposed at first predetermined position 57*a* every time a level or a frequency of the target noise changes. That is, first corrector 18*a* may correct the masker signal after the pitch shifting according to the level of the target noise detected by first microphone 54*a* at first predetermined position 57*a*. FIG. 7 is a flowchart of Operation Example 1.

In Operation Example 1, sound signal acquisition unit 15 in FIG. 2 acquires a first sound signal from first microphone 54*a*, and outputs the first sound signal to first corrector 18*a* (S21). Specifically, sound signal acquisition unit 15 is a circuit constructed with an amplifier circuit that amplifies the first sound signal acquired from first microphone 54*a*. However, there is no particular limitation on a specific mode of sound signal acquisition unit 15. Sound signal acquisition unit 15 may be constructed with a part of information acquisition unit 11.

First corrector 18*a* changes contents of the correction performed on the masker signal after the pitch shifting according to the first sound signal that has been acquired (S22). For example, in the case where first corrector 18*a* performs the correction multiplying the coefficient (gain), first corrector 18*a* increases the gain multiplied by the masker signal after the pitch shifting with increasing volume of the target noise fixed based on the first sound signal that has been acquired at first predetermined position 57*a*. Therefore, sound masking device 10 can suppress deficiency in volume of the masker sound.

Similarly, second corrector 18*b* may dynamically correct the masker signal after the pitch shifting according to the sound signal output from second microphone 54*b* disposed at second predetermined position 57*b* every time the level or frequency of the target noise changes. That is, second corrector 18b may correct the masker signal after the pitch shifting according to the level of the target noise detected by second microphone 54b at second predetermined position 57b.

In this case, sound signal acquisition unit 15 acquires a second sound signal from second microphone 54b, and outputs the second sound signal to second corrector 18b. Second corrector 18b changes contents of the correction performed on the masker signal after the pitch shifting according to the second sound signal that has been acquired. For example, in the case where second corrector 18b performs the correction multiplying the coefficient (gain), second corrector 18b increases the gain multiplied by the masker signal after the pitch shifting with increasing volume of the target noise fixed based on the second sound signal that has been acquired at second predetermined position 57b. Therefore, sound masking device 10 can suppress deficiency in volume of the masker sound.

As described above, first corrector 18a and second corrector 18b may correct the masker signal after the pitch shifting according to the sound signal. Therefore, sound masking device 10 can output the masker signal in consideration of a noise level at the predetermined position.

Figure 8:
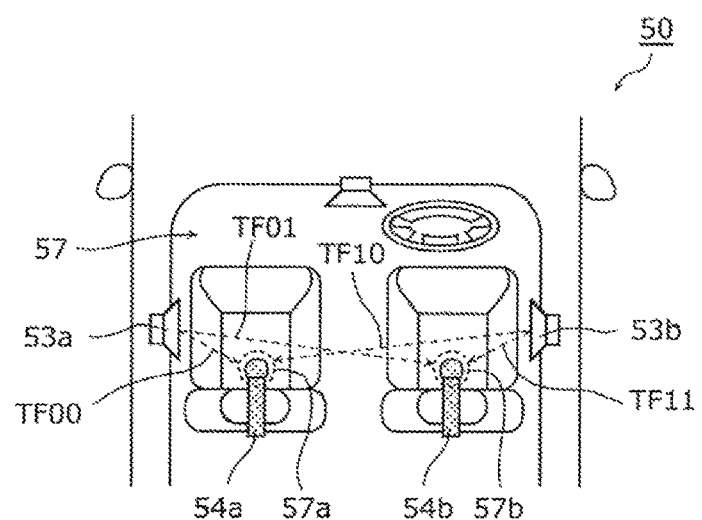
FIG. 8 is a view illustrating a transfer function in the vehicle.

In order to correct the masker signal with high accuracy, first corrector 18a may calculate the volume of the masker sound (masker signal) at first predetermined position 57a based on the transfer function (transfer characteristic). FIG. 8 is a view illustrating the transfer function in vehicle 50. The transfer function is actually measured in space 57 of vehicle 50 in advance, and stored in storage 14.

As illustrated in FIG. 8, the transfer function from first speaker 53a to first predetermined position 57a is expressed as TF00, and the transfer function from first speaker 53a to second predetermined position 57b is expressed as TF01. The transfer function from second speaker 53b to first predetermined position 57a is expressed as TF10, and the transfer function from second speaker 53b to second predetermined position 57b is expressed as TF11.

At this point, assuming that x is the masker signal after the pitch shifting, that A0 is the correction performed by first corrector 18a, and that A1 is the correction performed by second corrector 18b, masker signal x0 (masker sound) at first predetermined position 57a is given by Equation 1 below. Similarly masker signal x1 (masker sound) at second predetermined position 57b is given by Equation 2 below.

$$x0=(x*A0)*TF00+(x*A1)*TF10 \quad \text{(Mathematical expression 1)}$$

$$x1=(x*A0)*TF01+(x*A1)*TF11 \quad \text{(Mathematical expression 2)}$$

First corrector 18a can specify the level of the masker sound at first predetermined position 57a by calculation of Equation 1 above, and specify the level of the target noise at first predetermined position 57a by the first sound signal. Therefore, first corrector 18a may perform the correction on the masker signal after the pitch shifting such that the masker sound at first predetermined position 57a is larger than the target noise by a predetermined level as the correction corresponding to first predetermined position 57a. Specifically, first corrector 18a performs the correction such that a signal level of the same frequency component as the target noise in the masker signal after the pitch shifting is larger than a signal level of the target noise by the predetermined level.

Similarly, second corrector 18b can specify the level of the masker sound at second predetermined position 57b by calculation of Equation 2 above, and specify the level of the target noise at second predetermined position 57b by the second sound signal. Therefore, second corrector 18b may perform the correction on the masker signal after the pitch shifting such that the masker sound at second predetermined position 57b is larger than the target noise by a predetermined level, as the correction corresponding to second predetermined position 57b.

Through the above corrections, sound masking device 10 can suppress the deficiency in volume of the masker sound, and effectively mask the target noise.

In the case where the masker sound is excessively large, first corrector 18a may perform the correction on the masker signal after the pitch shifting such that the masker sound at first predetermined position 57a is smaller than the target noise by a predetermined level, as the correction corresponding to first predetermined position 57a. That is, first corrector 18a may perform the correction such that a difference in magnitude between the masker sound and the target noise is larger than the predetermined level at the predetermined position. The same holds true for second corrector 18b.

Operation Example 2

Figure 9:
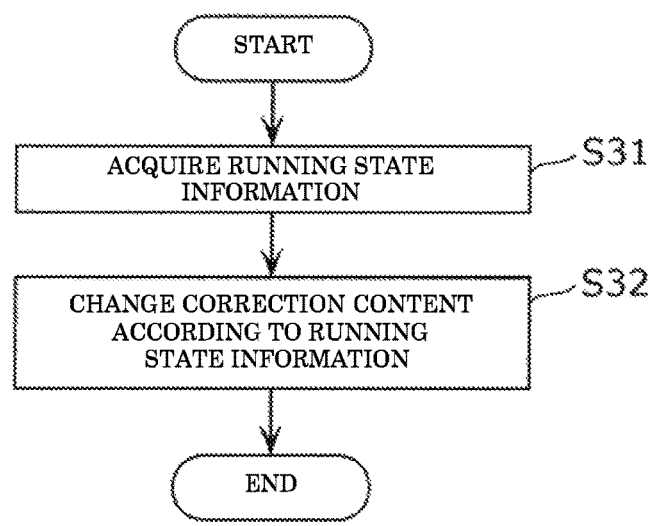
FIG. 9 is a flowchart illustrating Operation Example 2 of the sound masking device of the exemplary embodiment.

Operation Example 2 of sound masking device 10 will be described below. Although the target noise is caused by the rotation of rotator 51 as described above, the target noise changes according to a running state of vehicle 50 in the case where rotator 51 is used to drive the wheels. Therefore, first corrector 18a and second corrector 18b may dynamically change contents of the correction performed on the masker signal after the pitch shifting every time the running state changes. FIG. 9 is a flowchart of Operation Example 2.

In Operation Example 2, information acquisition unit 11 acquires running state information indicating the running state (changes according to running of vehicle 50) of vehicle 50 from vehicle controller 52, and outputs the running state information to signal processor 13 (first corrector 18a and second corrector 18b) (S31). The running state information includes at least one of load (torque) information about vehicle 50, speed information about vehicle 50, gas pedal position information about vehicle 50, brake hydraulic pressure information about vehicle 50, motor rotation number information about vehicle 50, engine rotation number information about vehicle 50, motor current value information about vehicle 50, and gear position information about vehicle 50.

First corrector 18a changes contents of the correction performed on the masker signal after the pitch shifting according to the running state information that has been acquired (S32). For example, in the case where first corrector 18a performs the correction multiplying the coefficient (gain), first corrector 18a increases the gain multiplied by the masker signal after the pitch shifting as the volume of the target noise increases in the running state fixed based on the running state information that has been acquired. Therefore, the deficiency in volume of the masker sound can be suppressed. Similarly, second corrector 18b may change contents of the correction performed on the masker signal after the pitch shifting according to the running state information that has been acquired.

As described above, first corrector 18a and second corrector 18b may correct the masker signal after the pitch shifting according to the running state of vehicle 50. Therefore, sound masking device 10 can output the masker signal in consideration of the running state of vehicle 50.

Operation Example 3

Operation Example 3 of sound masking device 10 will be described below. In space 57 in vehicle 50, sometimes the music or the like is played back by audio device 55 and third speaker 53c. When the masker sound is output in such cases, because the masker sound is sound, such as a noise, which is perceived by the occupant, possibly the unpleasantness is given to the occupant.

Figure 10:
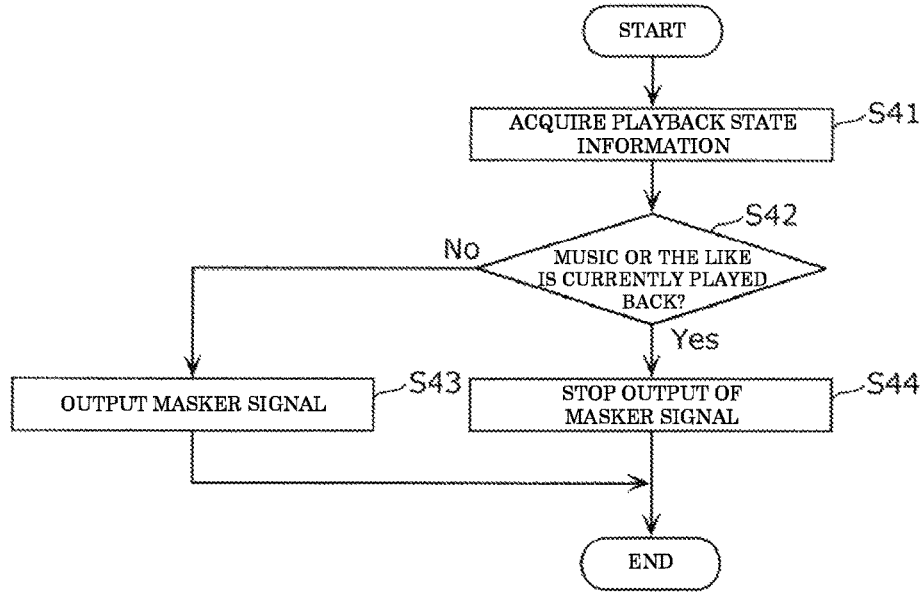
FIG. 10 is a flowchart illustrating Operation Example 3 of the sound masking device of the exemplary embodiment.

Therefore, in the case where it is determined that the sound is output from third speaker 53c (music or the like is played back), output unit 19 may stop the output of the masker signal after correction. FIG. 10 is a flowchart of Operation Example 3.

In Operation Example 3, information acquisition unit 11 acquires playback state information indicating whether the music or the like is currently played back by audio device 55 from audio device 55, and outputs the playback state information to determination unit 16 (S41). The playback state information may be acquired through vehicle controller 52.

Determination unit 16 determines whether the music or the like is currently played back based on the playback state information that has been acquired (S42). In other words, determination unit 16 determines whether the sound is output from third speaker 53c mounted in vehicle 50. Specifically, determination unit 16 is constructed with a processor such as a DSP. Alternatively, determination unit 16 may be constructed with a microcomputer, a dedicated circuit, or a combination of at least two of the processor, the microcomputer, and the dedicated circuit. Determination unit 16 may be constructed as a part of signal processor 13.

When determination unit 16 determines that the music or the like is not currently played back (No in S42), namely, that the sound is not output from third speaker 53c, output unit 19 outputs the masker signal after the correction to first speaker 53a and second speaker 53b (S43). On the other hand, determination unit 16 determines that the music or the like is currently played back (Yes in S42), namely, that the sound is output from third speaker 53c, output unit 19 stops the output of the masker signal after the correction (S44). In other words, output unit 19 does not output the masker signal after the correction to first speaker 53a and second speaker 53b.

As described above, output unit 19 may stop the output of the masker signal after the correction in the case where the music or the like is currently played back. Therefore, sound masking device 10 can output the masker signal in consideration of whether the music or the like is played back in vehicle 50.

Figure 11:
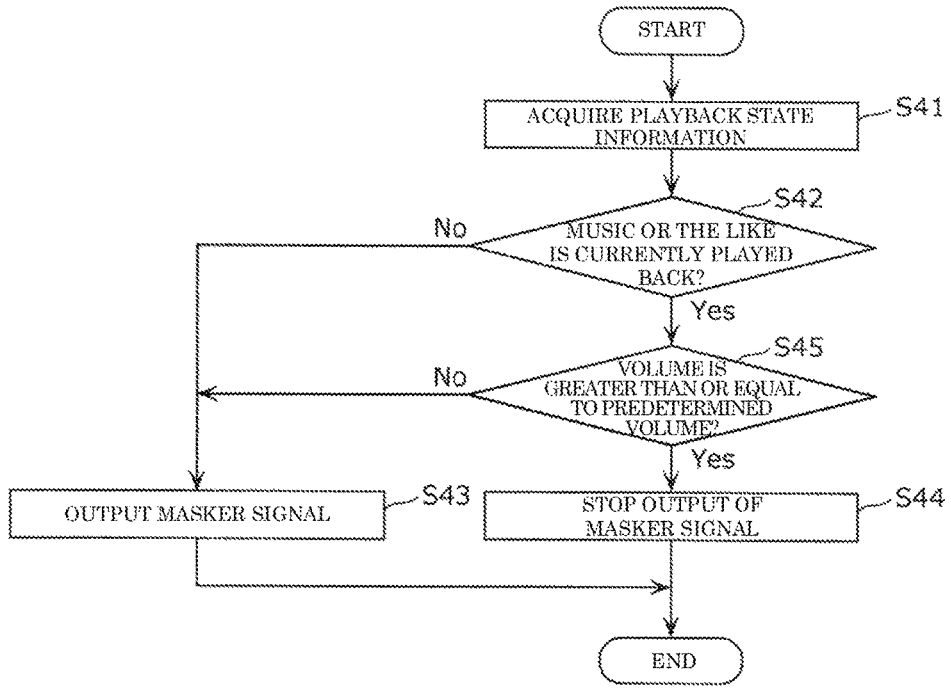
FIG. 11 is a flowchart illustrating a modification according to Operation Example 3 of the sound masking device of the exemplary embodiment.

Determination unit 16 may further determine whether the volume of the currently-played back music is greater than or equal to predetermined volume. FIG. 11 is a flowchart of a modification of Operation Example 3.

In the modification of Operation Example 3, the playback state information acquired in step S41 includes volume information about the currently-played back music or the like.

After determining that the music or the like is played back (Yes in S42), determination unit 16 further determines whether the volume of the currently-played back music is greater than or equal to predetermined volume (S45). That is, determination unit 16 determines whether the volume of the sound output from third speaker 53c is greater than or equal to the predetermined volume.

When determination unit 16 determines that the volume of the music or the like is less than the predetermined volume (No in S45), namely, that the sound output from third speaker 53c is less than the predetermined volume, output unit 19 outputs the masker signal after the correction to first speaker 53a and second speaker 53b (S43).

On the other hand, when determination unit 16 determines that the volume of the music or the like is greater than or equal to the predetermined volume (Yes in S45), namely, that the volume of the sound output from third speaker 53c is greater than or equal to the predetermined volume, output unit 19 stops the output of the masker signal after the correction (S44).

As described above, output unit 19 may stop the output of the masker signal after the correction in the case where the volume of the music or the like is greater than or equal to the predetermined volume during playback of the music or the like. Therefore, sound masking device 10 can stop the output of the masker sound in the case where the volume of the music or the like is larger and the masking of the target noise is not required.

Figure 12:
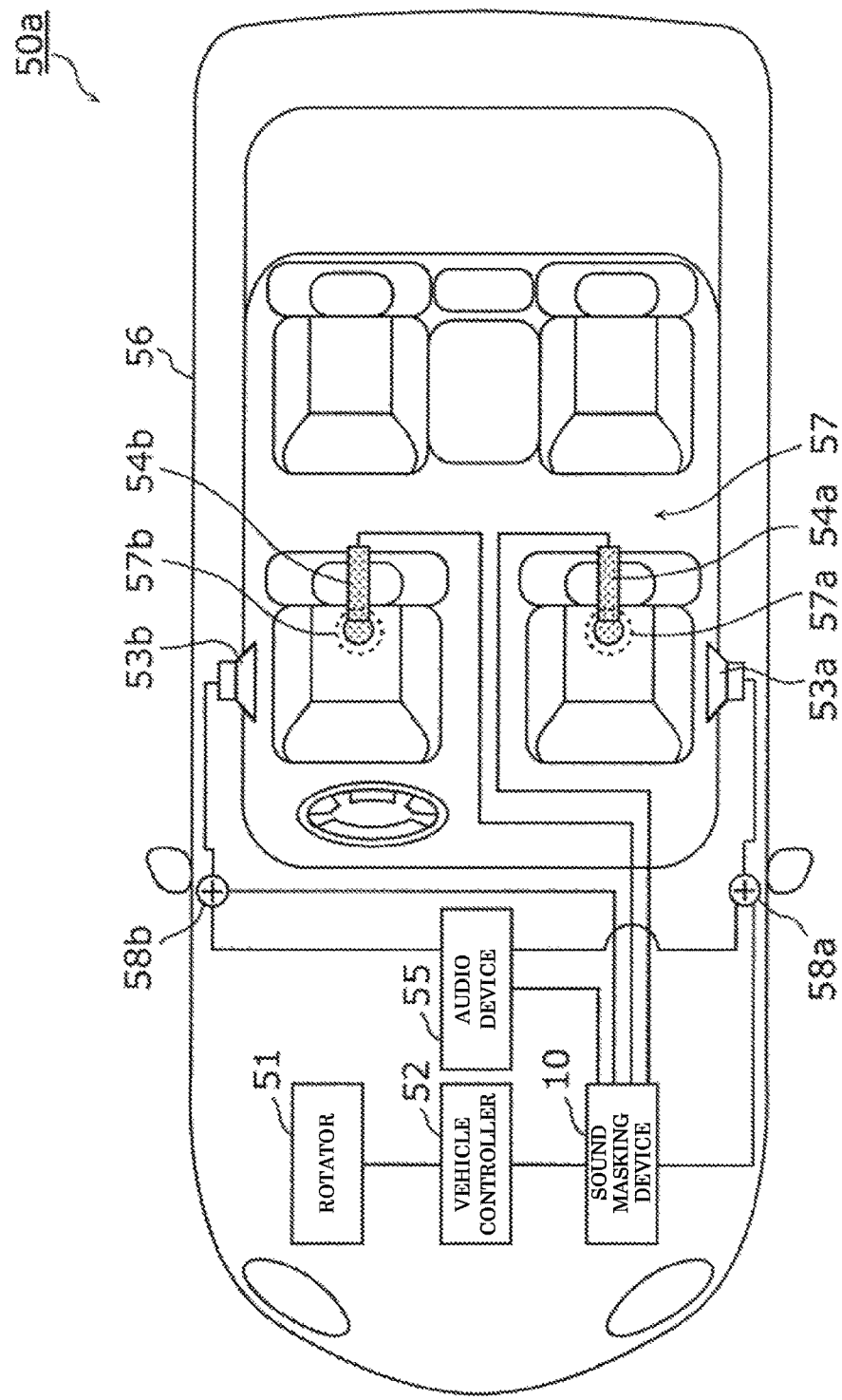
FIG. 12 is a schematic diagram illustrating a vehicle of the modification.
Figure 13:
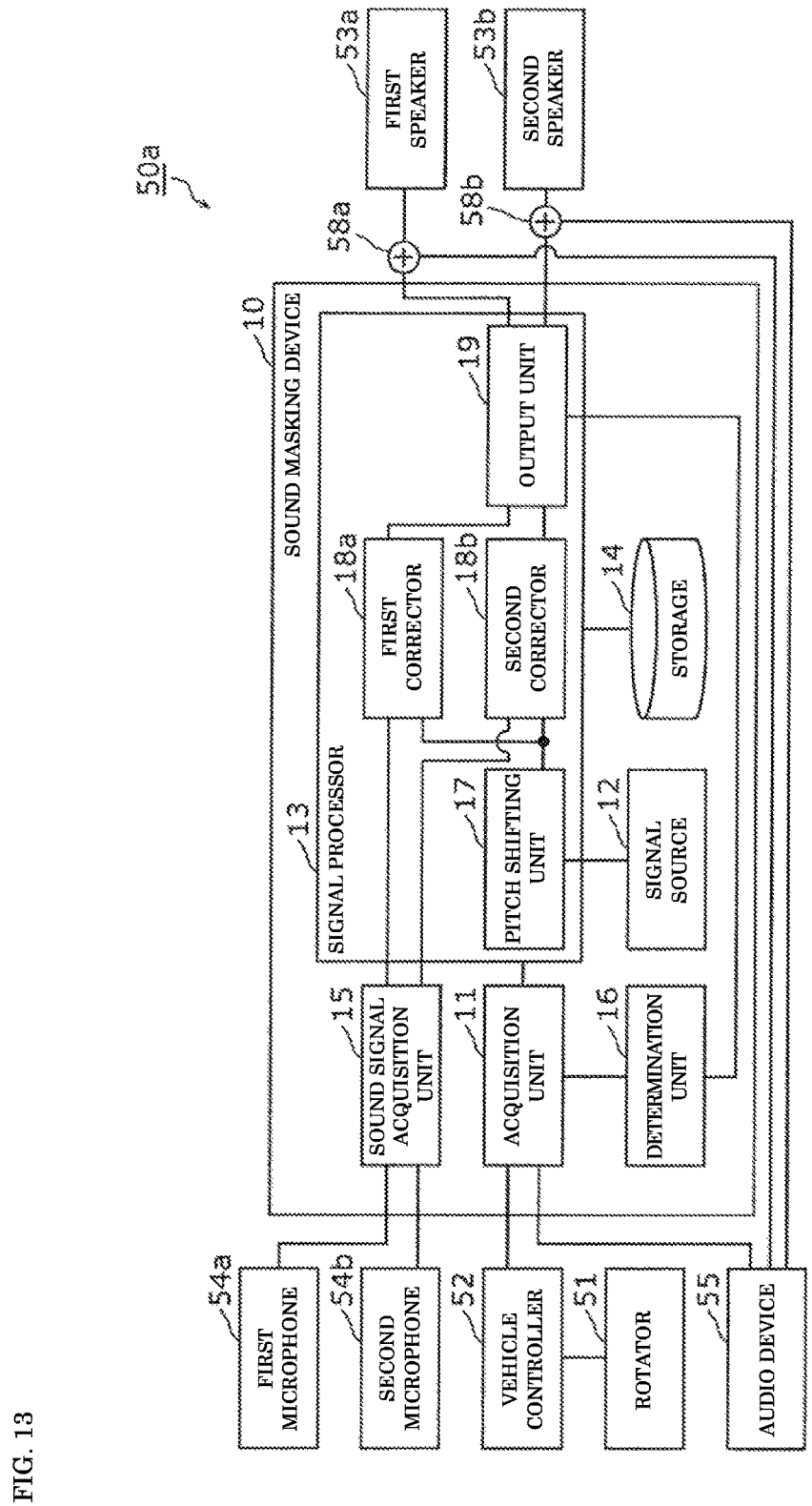
FIG. 13 is a functional block diagram corresponding to the vehicle of the modification.

In vehicle 50, the sound corresponding to the audio signal output from audio device 55 is output from third speaker 53c. Alternatively, the sound corresponding to the audio signal may be output from first speaker 53a and second speaker 53b. FIG. 12 is a schematic diagram illustrating a vehicle according to such a modification. FIG. 13 is a functional block diagram corresponding to the vehicle of the modification.

As illustrated in FIGS. 12 and 13, in vehicle 50a of the modification, the audio signal output by audio device 55 and the masker signal corrected by first corrector 18a are added (mixed) by first adder 58a, and output to first speaker 53a. Similarly, the audio signal output by audio device 55 and the masker signal corrected by second corrector 18b are added (mixed) by second adder 58b, and output to second speaker 53b. First adder 58a and second adder 58b may be constructed as an analog circuit or a digital circuit.

Thus, the speaker with which the music or the like is played back and the speaker from which the masker sound is output may commonly be used.

Other Exemplary Embodiments

Although the exemplary embodiment is described above, the present disclosure is not limited to the exemplary embodiment.

Figure 14:
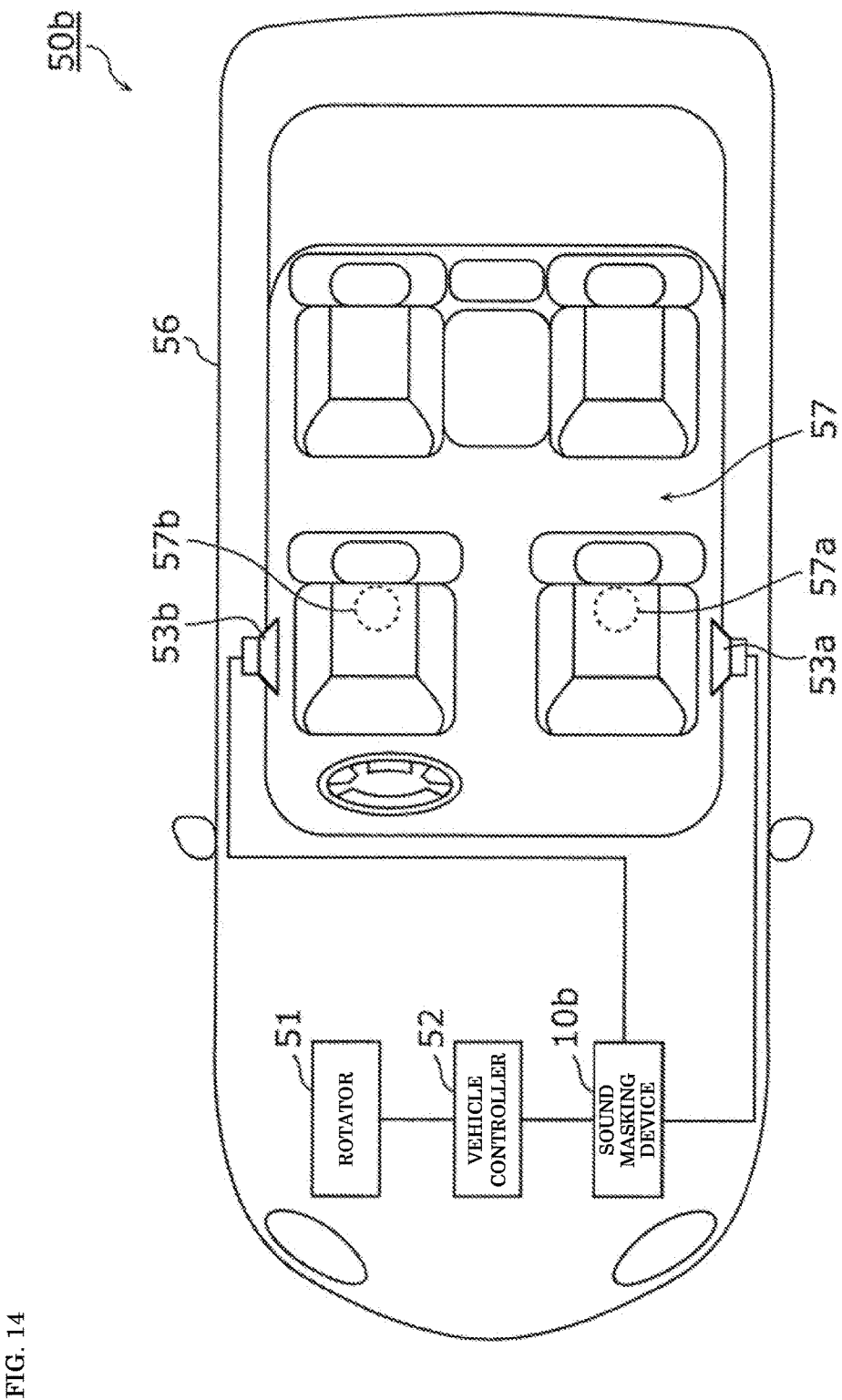
FIG. 14 is a schematic diagram illustrating a vehicle including a sound masking device according to another exemplary embodiment.
Figure 15:
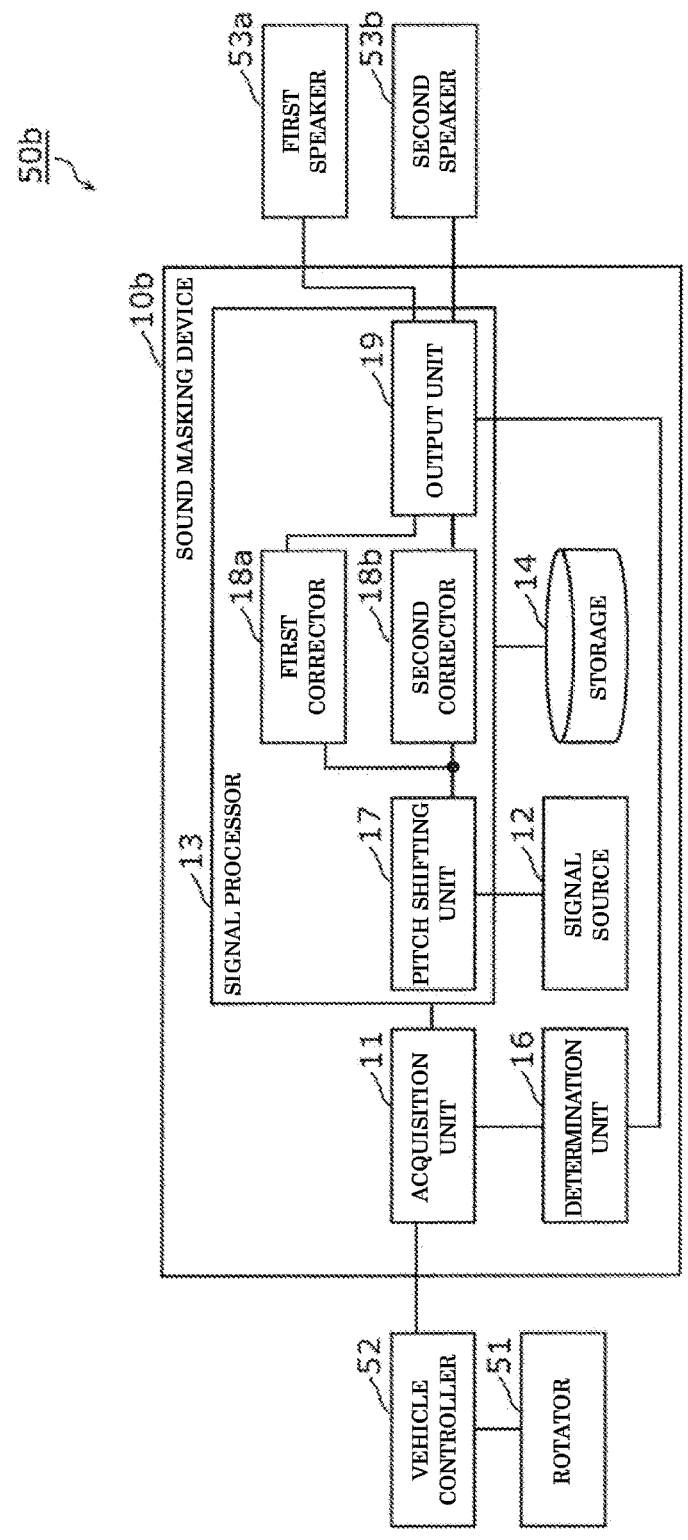
FIG. 15 is a functional block diagram illustrating the sound masking device of another exemplary embodiment.

For example, the sound masking device may be constructed simpler than sound masking device 10 of the exemplary embodiment. FIG. 14 is a schematic diagram illustrating a vehicle including the simply-constructed sound masking device. FIG. 15 is a functional block diagram of the simply-constructed sound masking device.

As illustrated in FIG. 14, vehicle 50b including simply-constructed sound masking device 10b differs from sound masking device 10 in that vehicle 50b does not include first microphone 54a, second microphone 54b, and audio device 55. As illustrated in FIG. 15, sound masking device 10b differs from sound masking device 10 in that sound masking device 10b does not include sound signal acquisition unit 15.

In sound masking device 10b, similarly to sound masking device 10, the masker signal is corrected according to the predetermined position, so that the noise can effectively be masked at the predetermined position.

In the exemplary embodiment, there are two speakers that output the masker sound. There may be one speaker that outputs the masker sound. Alternatively, there may be at least three speakers that output the masker sound. For example, four speakers may be disposed corresponding to four seats in the vehicle.

In the exemplary embodiment, one predetermined position is disposed with respect to one seat. Alternatively, a plurality of predetermined positions may be disposed with respect to one seat. For example, two positions corresponding to positions of the ears of the occupant who sits on the seat may be set to the predetermined positions.

The configuration of the sound masking device of the exemplary embodiment is only by way of example. For example, the sound masking device may include a digital-analog (DA) converter, a filter, a power amplifier, or an analog-digital (AD) converter.

The processing performed by the sound masking device of the exemplary embodiment is only by way of example. Various pieces of signal processing described in the exemplary embodiment may be performed by digital signal processing or analog signal processing.

In the exemplary embodiment, each component may be constructed with dedicated hardware, or implemented by execution of a software program suitable for each component. A program execution unit such as a central processing unit (CPU) and a processor reads and executes a software program stored in a recording medium such as a hard disk and a semiconductor memory, whereby each component may be implemented.

Each component may be a circuit (or integrated circuit). These circuits may constitute one circuit as a whole, or may be an individual circuit. These circuits may be a general-purpose circuit or a dedicated circuit.

A general or specific mode of the present disclosure may be implemented by a system, a device, a method, an integrated circuit, a computer program, or a computer-readable, non-transitory recording medium such as a CD-ROM. The general or specific mode of the present disclosure may be implemented by any combination of the system, the device, the method, the integrated circuit, the computer program, and the computer-readable, non-transitory recording medium.

For example, the present disclosure may be implemented as the sound masking method performed by the sound masking device (a computer or a DSP), or implemented as a program that causes the computer or DSP to execute the sound masking method.

In the exemplary embodiment, the processing performed by the specific processor may be performed by another processor. The order of the plurality of pieces of processing in the operation of the sound masking device described in the exemplary embodiment may be changed, or the plurality of pieces of processing may concurrently be performed.

The present disclosure also encompasses exemplary embodiments obtained by making various modifications conceived by those skilled in the art to the exemplary embodiment and exemplary embodiments implemented by any combination of components and functions of the exemplary embodiment without departing from the scope of the present disclosure.

For example, the sound masking device of the present disclosure is useful for the device that masks the noise in the vehicle interior.

What is claimed is:

1. A sound masking device comprising:
a memory that stores instructions; and
a processor that, when executing the instructions stored in the memory, performs operations comprising:
acquiring frequency information indicating a frequency of a noise in a vehicle;
generating a base signal in order to mask the noise;
pitch-shifting the base signal according to the frequency information;
correcting the pitch-shifted base signal according to a plurality of positions in the vehicle to generate a plurality of different masker signals corresponding to the plurality of positions, wherein each masker signal of the plurality of different masker signals is individually corrected based on a different corresponding position of the plurality of positions; and
outputting the plurality of different masker signals to a respective plurality of speakers corresponding to the plurality of positions, the plurality of speakers being mounted in the vehicle, each speaker of the plurality of speakers respectively outputting a different masker sound according to a corresponding different masker signal of the plurality of different masker signals.

2. The sound masking device according to claim 1, wherein each different masker sound has a characteristic in which volume fades in and fades out.

3. The sound masking device according to claim 1, wherein the pitch-shifted base signal is corrected by multiplying the pitch-shifted base signal by each of a plurality of coefficients corresponding to each of the plurality of positions.

4. The sound masking device according to claim 1, wherein the pitch-shifted base signal is corrected by filter-processing the pitch-shifted base signal according to each of the plurality of positions.

5. The sound masking device according to claim 1, wherein the pitch-shifted base signal is corrected by phase-shifting the pitch-shifted base signal according to each of the plurality of positions.

6. The sound masking device according to claim 1, wherein the pitch-shifted base signal is corrected such that a difference in magnitude between each of the different masker sounds and the noise is greater than or equal to a predetermined level.

7. The sound masking device according to claim 1, wherein
the processor, when executing the instructions stored in the memory, further performs operations comprising:
acquiring running state information about the vehicle, and
correcting the pitch-shifted base signal according to the running state information.

8. The sound masking device according to claim 7, wherein the running state information includes at least one of load information about the vehicle, speed information about the vehicle, gas pedal position information about the vehicle, and gear position information in the vehicle.

9. The sound masking device according to claim 7, wherein the running state information includes at least one of brake hydraulic pressure information, motor rotation number information, engine rotation number information, and motor electrical current value information about the vehicle.

10. The sound masking device according to claim 1, wherein one of the plurality of positions is a position on which an occupant sits in the vehicle.

11. The sound masking device according to claim 1, wherein the processor, when executing the instructions stored in the memory, further performs operations comprising:
acquiring a plurality of sound signals output by a plurality of microphones mounted at the plurality of positions in the vehicle, and
correcting the pitch-shifted base signal according to each of the polarity of sound signals.

12. The sound masking device according to claim 1, wherein the base signal is generated by performing noise filter processing on a noise signal.

13. The sound masking device according to claim 12, wherein the noise signal is a white noise.

14. The sound masking device according to claim 12, wherein the noise filter processing is filter processing in which a bandpass filter is used.

15. The sound masking device according to claim 1, wherein the processor, when executing the instructions stored in the memory, further performs operations comprising:
determining whether sound is output from a second speaker mounted in the vehicle, and
stopping outputting of a said different masker sound upon determining that the sound is output from the second speaker.

16. The sound masking device according to claim 15, wherein
the processor, when executing the instructions stored in the memory, further performs operations comprising:
determining whether a volume of the sound output from second the speaker is greater than or equal to a predetermined volume, and
stopping outputting of the masker sound upon determining that the volume of the sound output from the second speaker is greater than or equal to the predetermined volume.

17. A sound masking device comprising:
a memory that stores instructions; and
a processor that, when executing the instructions stored in the memory, performs operations comprising:
acquiring rotation number information about a rotator, the rotation number information being correlated to a frequency of a noise in a vehicle;
generating a base signal in order to mask the noise;
pitch-shifting the base signal according to the rotation number information;
correcting the pitch-shifted base signal according to a plurality of positions in the vehicle to generate a plurality of different masker signals corresponding to the plurality of positions, wherein each masker signal of the plurality of different masker signals is individually corrected based on a different corresponding position of the plurality of positions; and
outputting the plurality of different masker signals to a respective plurality of speakers corresponding to the plurality of positions, the plurality of speakers being mounted in the vehicle, each speaker of the plurality of speakers respectively outputting a different masker sound according to a corresponding different masker signal of the plurality of different masker signals.

18. A vehicle comprising:
the sound masking device according to claim 1;
wherein the plurality of speakers each respectively outputs a different masker sound according to the plurality of different masker signals.

19. A sound masking method comprising:
acquiring frequency information indicating a frequency of a noise in a vehicle;
generating a base signal in order to mask the noise;
pitch-shifting the base signal according to the frequency information;
correcting the pitch-shifted base signal according to a plurality of positions in the vehicle to generate a plurality of different masker signals corresponding to the plurality of positions, wherein each masker signal of the plurality of different masker signals is individually corrected based on a different corresponding position of the plurality of positions; and
outputting the plurality of different masker signals to a respective plurality of speakers corresponding to the plurality of positions, the plurality of speakers being mounted in the vehicle, each speaker of the plurality of speakers respectively outputting a different masker sound according to a corresponding different masker signal of the plurality of different masker signals.

20. A sound masking method comprising:
acquiring rotation number information about a rotator, the rotation number information being correlated to a frequency of a noise in a vehicle;
generating a base signal in order to mask the noise;
pitch-shifting the base signal according to the rotation number information, the rotation number information being correlated to a frequency of a noise in a vehicle;
correcting the pitch-shifted base signal according to a plurality of positions in the vehicle to generate a plurality of different masker signals corresponding to the plurality of positions, wherein each masker signal of the plurality of different masker signals is individually corrected based on a different corresponding position of the plurality of positions; and
outputting the plurality of different masker signals to a respective plurality of speakers corresponding to the plurality of positions, the plurality of speakers being mounted in the vehicle, each speaker of the plurality of speakers respectively outputting a different masker sound according to a corresponding different masker signal of the plurality of different masker signals.

21. A sound masking device comprising:
a memory that stores instructions; and
a processor that, when executing the instructions stored in the memory, performs operations comprising:
acquiring speed information indicating a speed of a vehicle;
generating a signal in order to mask the noise;
pitch-shifting the signal according to the speed information;
correcting the pitch-shifted signal according to a plurality of positions in the vehicle to generate a plurality of different masker signals corresponding to the plurality of positions, wherein each masker signal of the plurality of different masker signals is individually corrected based on a different corresponding position of the plurality of positions; and
outputting the plurality of different masker signals to a respective plurality of speakers corresponding to the plurality of positions, the plurality of speakers being mounted in the vehicle, each speaker of the plurality of speakers respectively outputting a different masker sound according to a corresponding different masker signal of the plurality of different masker signals.

* * * * *